(12) United States Patent
Marsolek et al.

(10) Patent No.: US 12,128,790 B2
(45) Date of Patent: Oct. 29, 2024

(54) ELECTRICALLY DRIVEN WORKING MACHINE HAVING A PLURALITY OF OPERATING MODES

(71) Applicant: Caterpillar Paving Products Inc., Brooklyn Park, MN (US)

(72) Inventors: John L. Marsolek, Watertown, MN (US); Nicholas A. Oetken, Brooklyn Park, MN (US); Kenneth G Jones, Princeton, MN (US); David Edwin Gerding, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 435 days.

(21) Appl. No.: 17/503,102

(22) Filed: Oct. 15, 2021

(65) Prior Publication Data

US 2023/0117372 A1    Apr. 20, 2023

(51) Int. Cl.
*B60L 58/13*  (2019.01)
*B60L 1/00*  (2006.01)
*B60L 1/08*  (2006.01)

(52) U.S. Cl.
CPC .............. *B60L 58/13* (2019.02); *B60L 1/003* (2013.01); *B60L 1/08* (2013.01); *B60L 2200/40* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 9,211,796 B2 | 12/2015 | Nagayanagi et al. | |
| 10,377,389 B2 | 8/2019 | Bryan et al. | |
| 10,442,313 B2 * | 10/2019 | Cholewa | B60L 53/11 |
| 10,661,857 B2 | 5/2020 | Takatsuka et al. | |
| 2020/0047629 A1 | 2/2020 | Cho | |

FOREIGN PATENT DOCUMENTS

| | | | | |
|---|---|---|---|---|
| CN | 112026585 | | 12/2020 | |
| CN | 112537205 | | 3/2021 | |
| EP | 3702313 A1 * | | 9/2020 | B60L 50/60 |
| EP | 3234506 | | 11/2020 | |
| EP | 3929141 A1 * | | 12/2021 | B60L 1/003 |
| WO | WO-2008041892 A1 * | | 4/2008 | B60K 6/48 |

* cited by examiner

Primary Examiner — Raul J Rios Russo
Assistant Examiner — Carl F. R. Tchatchouang

(57) ABSTRACT

A working machine includes one or more batteries driving movement of the working machine within a work area. The working machine includes a controller configured to receive criteria relating to one or more operational characteristics of the working machine and determine one of a plurality of operation modes for the working machine based upon the criteria and a remaining charge of one or more batteries.

20 Claims, 5 Drawing Sheets

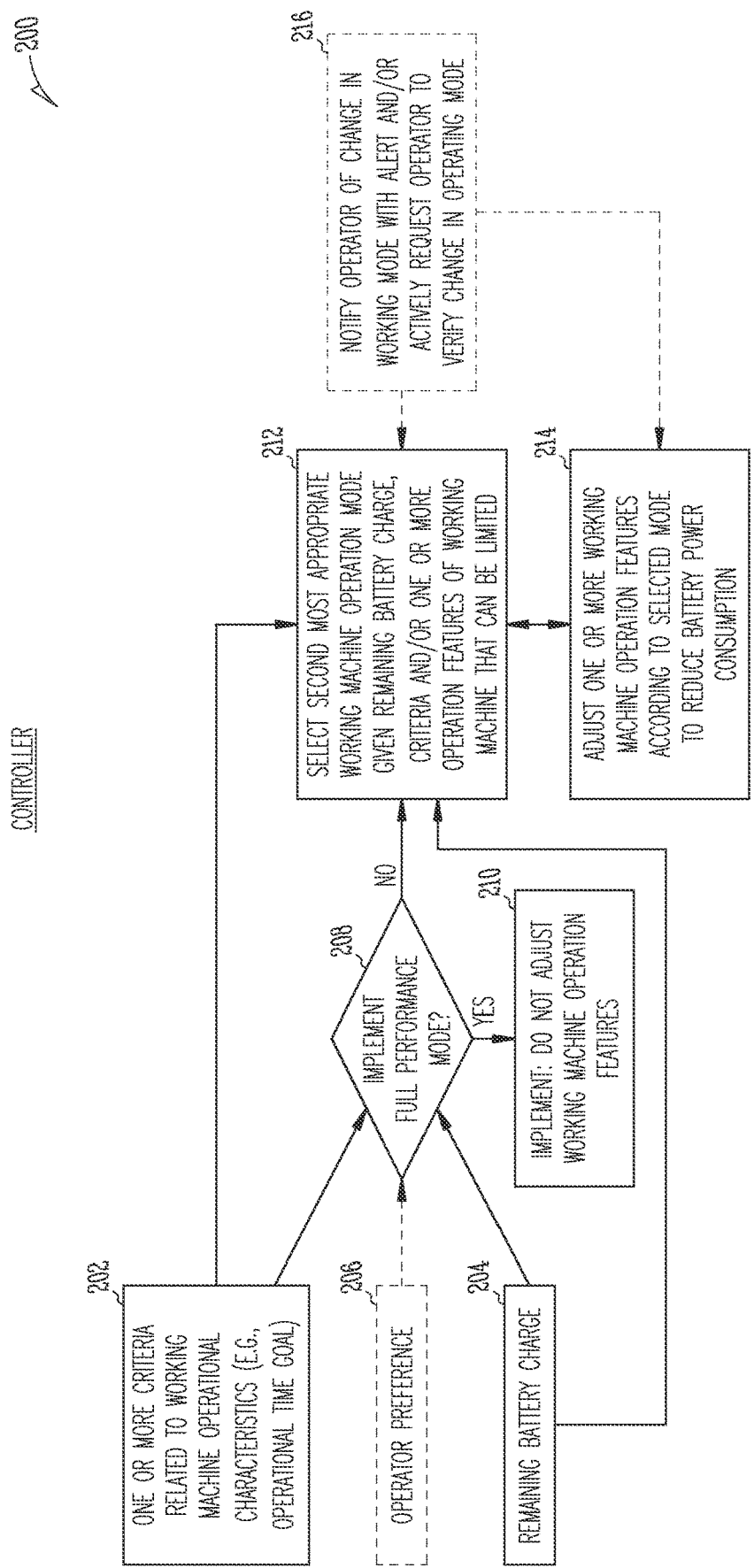

302 — FULL PERFORMANCE MODE
- DO NOT LIMIT OPERATIONAL FEATURES OF WORKING MACHINE CONSERVING BATTERY NOT OF CONCERN

304 — BATTERY POWER CONSERVATION MODE
- LIMIT ONE OR MORE OPERATIONAL FEATURES OF WORKING MACHINE TO CONSERVE BATTERY
  - E.G., TURN OFF OR REDUCE LIGHTS IF DAYTIME
  - E.G., REDUCE ABILITY OF MACHINE TO ACCELERATE
  - E.G., REDUCE SPEED OF MACHINE
  - E.G., WITH COMPACTOR REDUCE VIBRATION FREQUENCY OR VIBRATION AMPLITUDE OR COMPLETELY DISABLE

- E.G., WITH PAVER REDUCE SCREED HEAT
  - E.G., REDUCE OR DISABLE AUXILIARY SYSTEM(S) OF WORKING MACHINE
  - E.G., REDUCE OR DISABLE HEAT OR AIR CONDITIONING TO OPERATOR CABIN (CAN BE BASED UPON IF AMBIENT TEMPERATURE IS IN SELECTED RANGE AND/OR WINDOW IS OPEN)

- E.G., MANAGE TIRE PRESSURE

306 — FAILSAFE OPERATION MODE
- CONSERVE BATTERY TO PROVIDE SUFFICIENT MOTIVE ENERGY TO RETURN WORKING MACHINE TO CHARGING STATION

- CONSERVE BATTERY TO PERFORM ANY ESSENTIAL TASKS REQUIRED PRIOR TO WORKING MACHINE SHUTDOWN
  - E.G., WITH PAVER ENSURE THAT HOPPER IS CLEARED OF HOT ASPHALT PRIOR TO TOTAL BATTERY DISCHARGE

*Fig. 4*

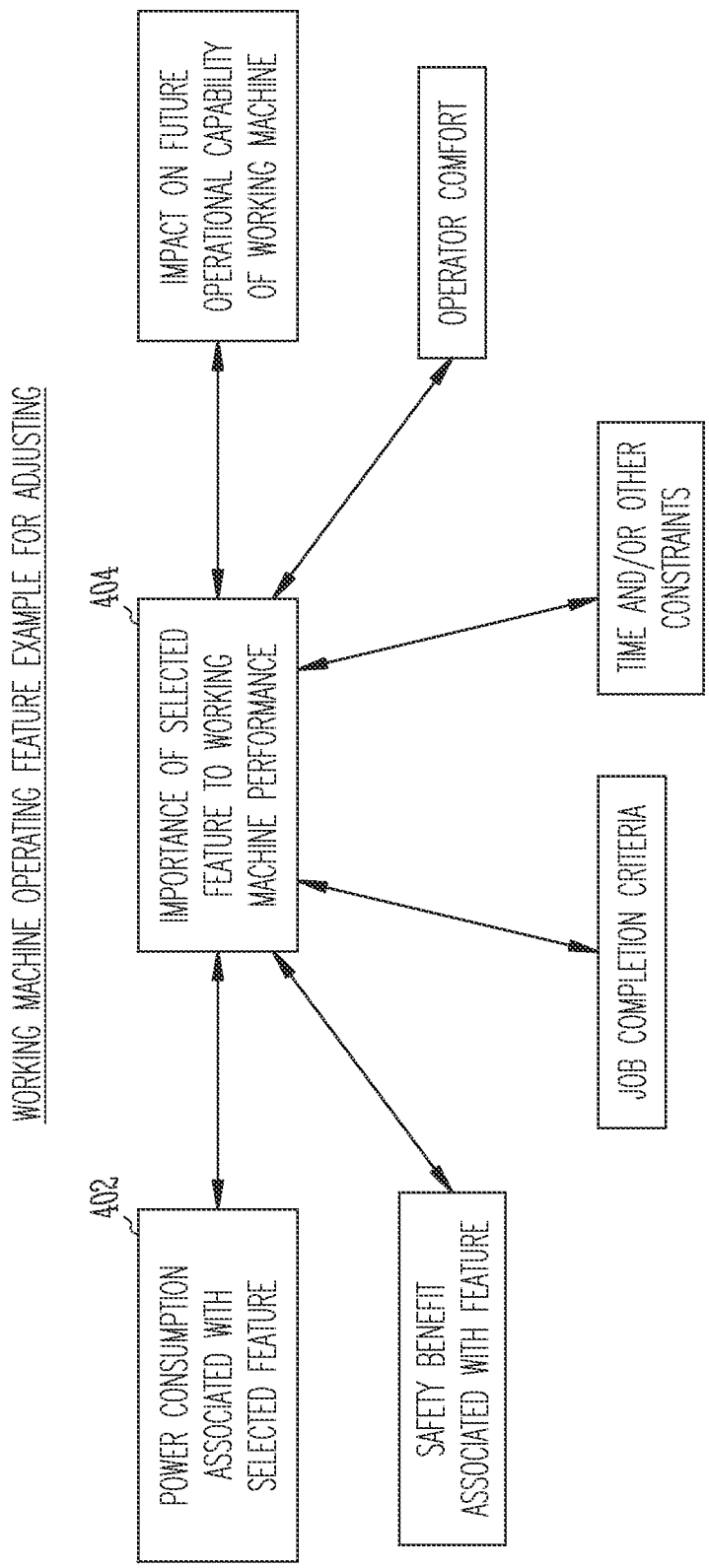

ELECTRICALLY DRIVEN WORKING MACHINE HAVING A PLURALITY OF OPERATING MODES

TECHNICAL FIELD

The present application relates generally to working machines. More particularly, the present application relates to electrically driven working machines having a plurality of operating modes including modes for battery power management.

BACKGROUND

Working machines such as paving equipment, earth moving equipment and mining equipment are used to perform various heavy duty tasks. Paving equipment includes various machines that are used to remove, grind, apply, spread and compact paving material. These paving machines are regularly used in the construction of roads, parking lots and other areas where a smooth durable surface is required for cars, trucks and other vehicles to travel.

Working machines must be powered including during operation. Increasingly, batteries have been utilized to power motive operation of working machines in addition to powering auxiliary equipment and machine electrical systems.

Transportation vehicles powered by batteries such as those discussed in E.P. Pat. No. 3,234,506 and U.S. Pat. No. 9,322,796 have developed power management systems that reduce battery load and increase operation lite of the transportation vehicles between battery charges. These patents use residual capacity remaining in the battery to limit the speed and/or acceleration of the vehicle, for example.

SUMMARY OF THE INVENTION

In one example, a working machine is disclosed. The working machine includes one or more batteries driving movement of the working machine within a work area. The working machine includes a controller configured to receive criteria relating to one or more operational characteristics of the working machine and determine one of a plurality of operation modes for the working machine based upon the criteria and a remaining charge of one or more batteries.

In another example, a method of controlling power consumption of one or more batteries of a working machine. The method includes monitoring with a controller criteria relating to one or more operational characteristics of the working machine, determining with the controller one of a plurality of operation modes for the working machine based upon the criteria and a remaining charge of one or more batteries and implementing the one of the plurality or operation modes for the working machine.

In another example, a system for controlling power consumption of one or more batteries of a working machine. The system includes a working machine. The working machine includes one or more batteries carried by the working machine and providing motive power for the working machine. The working machine includes one or more sensors carried by the working machine and configured to collect one or more operational characteristics of the working machine. The system includes a controller configured to receive criteria including a signal from the one or more sensors regarding operation of one or more features of the working machine and determine one of a plurality of operation modes for the working machine based upon the criteria and a remaining charge of one or more batteries.

BRIEF DESCRIPTION OF THE DRAWINGS

FIG. 3 is a flow chart illustrating a technique for controlling the power consumption of the battery for the working machine according to an example of the present application.

FIG. 4 is a highly schematic diagram illustrating a plurality of operation modes of the working machine according to an example of the present application.

FIG. 5 is a highly schematic diagram illustrating an example of factors to consider when adjusting one or more operational features of the working machine to reduce battery power consumption according to an example of the present application.

DETAILED DESCRIPTION

Figure 1:
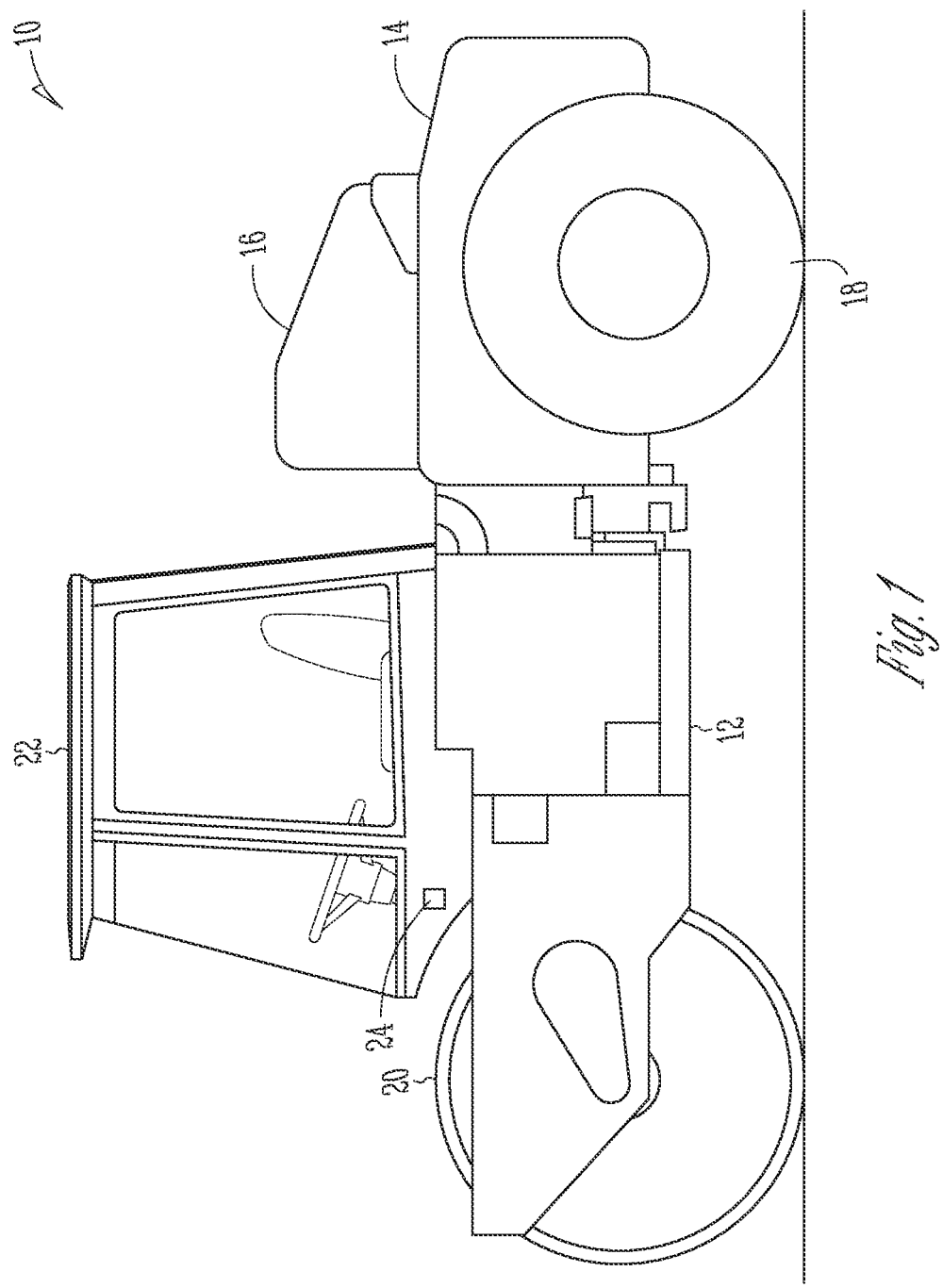
FIG. 1 is a highly schematic illustration a working machine comprising a compactor motively powered by a battery according to an example of the present application.

FIG. 1 shows a working machine 10 in a highly schematic manner. FIG. 1 shows the working machine 10 as a compactor. However, this is merely for exemplary illustration purposes. It is understood the techniques, systems, methods and features described herein can be used on any working machine such as any machine used for paving, construction, mining, etc.

The working machine 10 can be, for example, a vibratory drum compactor, which may be used to process various materials, including compacting asphalt. In FIG. 1, the working machine 10 includes a frame 12 to which a body 14 is coupled, one or more batteries 16 (a power generator as further discussed herein), motive units 18 (e.g., wheels, tracks, etc.), a drum 20, a cab 22, and a controller 24. Although not depicted, the working machine 10 also includes brakes associated with and configured to limit and/or stop rotation of the motive units 18.

The working machine 10 includes the frame 12, to which the body 14 of the working machine 10 is attached. The frame 12 can include one or more portions and/or separate frames coupled to one another. In an example, frame 12 includes multiple frames, which are coupled to and configured to articulate relative to one another.

The working machine 10 also includes the one or more batteries 16, which is configured to generate power to propel the working machine 10. The one or more batteries can be operatively coupled the motive units 18 such as via drive train components (e.g., an electric motor, transmission, etc.) as known in the art. In addition to propelling the working machine 10 over various terrains, the power generated by the one or more batteries 16 can be used for various operational tasks of the machine, including for powering a machine electrical system, powering machine auxiliary systems such as a vibratory system of the drum 20, etc.

The drum 20 can be coupled to and configured to rotate relative to the frame 12. The drum 20 can provide static compaction force (i.e. weight caused by gravity) to process materials, as well as can be coupled to one or more mechanisms, which can be powered by the one or more batteries 16. These one or more mechanisms can be configured to vibrate the drum and thereby provide dynamic forces to improve compaction results. The drum 20 can be a number of different sizes, materials, weights, shapes, among other characteristics, depending upon the intended use of working machine 10.

The working machine 10 also includes the controller 24, which can be, as an example, an electronic control unit (ECU) 24. In the example of FIG. 1, the ECU 24 can be located within the cab 22. Although the ECU 24 is shown in the cab 22 in the example of FIG. 1, in other examples the ECU 24 could be positioned at different locations of the working machine 10 or could have portions thereof that are remote from and of the working machine 10, The ECU 24 can include transmitter, receiver, transceiver, and other componentry configured to enable the ECU 24 to communicate and exchange information, data, signals, as examples, with other systems and/or machines/vehicles.

The ECU 24 can be an embedded system that controls machine electrical systems and/or other subsystems of the machine. Types of ECUs include Electronic/engine Control Module, Powertrain Control Module, Transmission Control Module, Brake Control Module, Suspension Control Module, among other examples. In the case of industrial, construction, and other heavy machinery, example ECUs can also include an Implement Control Module associated with one or more implements coupled to and operable from the machine.

The ECUs and other electronic controls of working machine 10, including ECU 24 can include software, hardware, and combinations of hardware and software configured to execute a number of functions attributed to the components in the disclosed examples. The ECUs or other electronic controls of working machine 10 can be an analog, digital, or combination analog and digital controllers including a number of components. As examples, the ECUs and other electronic controls of working machine 10 can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

The ECUs and other electronic controls of working machine 10 may include storage media to store and/or retrieve data or other information, for example, signals from sensors. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, ECU 24.

The ECUs and other electronic controls of working machine 10 can be configured to communicate with one another and with other components of working machine 10 via various wired or wireless communications technologies and components using various public and/or proprietary standards and/or protocols. Examples of transport mediums and protocols for electronic communication between components of machine include Ethernet, Transmission Control Protocol/Internet Protocol (TCP/IP), 802.11 or Bluetooth, or other standard or proprietary transport mediums and communication protocols.

Figure 2:
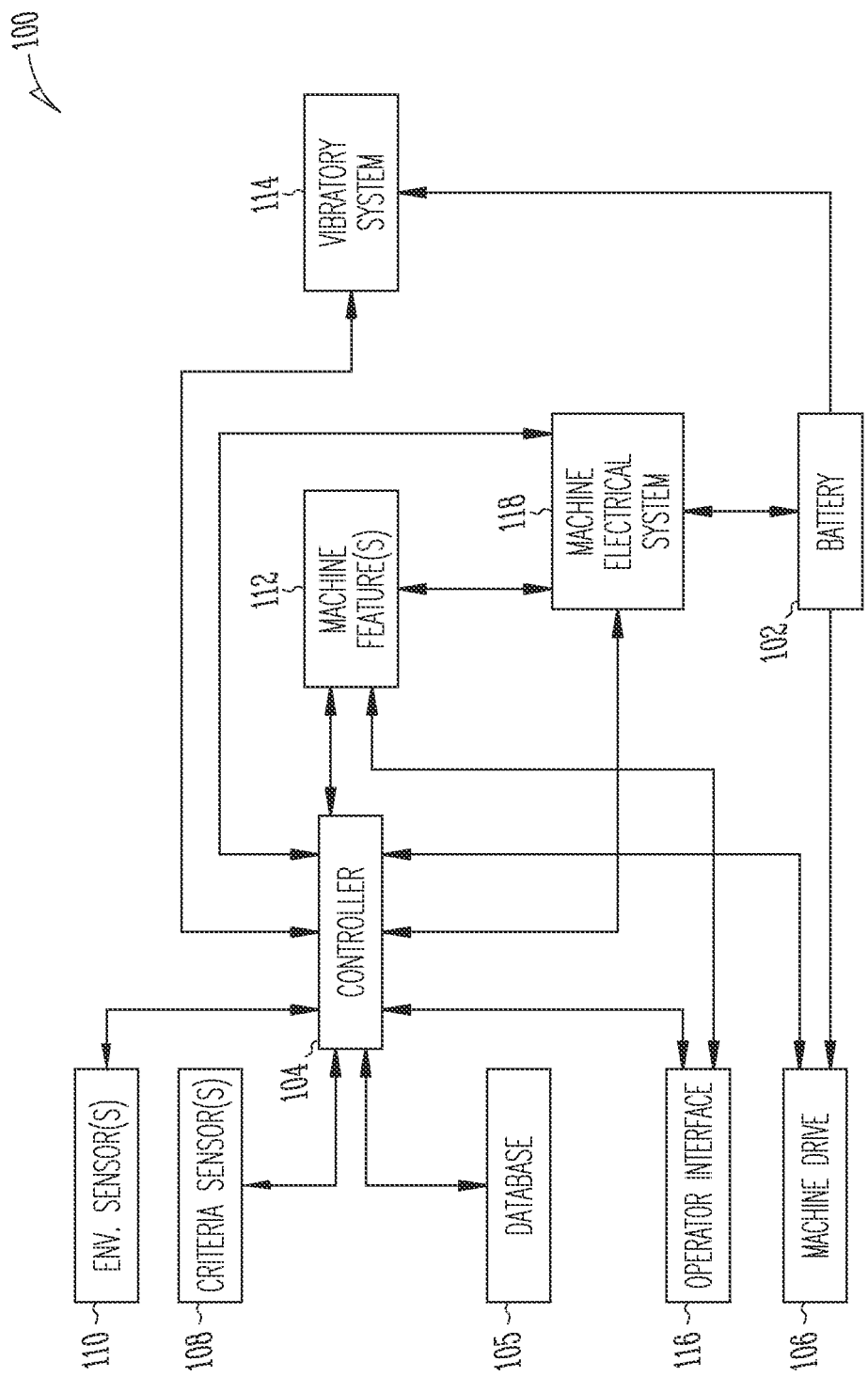
FIG. 2 is a highly schematic diagram illustrating a system for controlling power consumption of the battery of the working machine according to an example of the present application.

FIG. 2 shows a schematic diagram of an exemplary control system 100 for the working machine 10 (e.g., the compactor of FIG. 1). The system 100 can include some of the components previously described. Thus, the system 100 can include a battery 102 (e,g., one or more batteries 16), a controller 104 (e,g., ECU 24), a database 105, a machine drive 106 (e.g., drive units 18), criteria sensor(s) 108, environmental sensor(s) 110, machine feature(s) 112, a vibratory system 114, an operator interface 116 and an electrical system 118.

Control of the working machine 10 can be managed by the embedded or integrated controller 104 of the working machine 10. The controller 104 can comprise one or more processors, microprocessors, microcontrollers, electronic control modules (ECMs), electronic control units (ECUs), or any other suitable means for electronically controlling functionality of the working machine 10 as previously discussed.

The controller 104 can be configured to operate according to a predetermined algorithm or set of instructions for control and power management of the battery 102 of the working machine 10. Such control can be based on various criteria, (e.g., operating conditions of the working machine 10), a charge level of the battery 102 and/or power consumption of the one or more feature(s) 112 of the working machine 10 as further discussed herein. The inputs to the controller 104 such as criteria can be sensed, for example, such as by the criteria sensor(s) 108 and/or the environmental sensor(s) 110, as well as other sensor(s). However, the input can additionally or alternatively be operator input(s), database input(s) and/or other input(s) according to some examples. In an example, the controller 104 can execute instructions stored in memory of the database 105 for performing the methods and techniques described with reference to FIGS. 3-5. An algorithm or set of instructions can be stored in the database 105 and can be read into an on-board memory of the controller 104, or preprogrammed onto a storage medium or memory accessible by the controller 104, for example, in the form of a hard drive, optical medium, random access memory (RAM), read-only memory (ROM), or any other suitable computer readable storage medium commonly used in the art (each referred to as a "database").

The controller 104 can be in electrical communication or connected to various system 100 components including (but not limited to) the machine drive 106, the criteria sensor(s) 108, the environmental sensor(s) 110, the machine feature(s) 112, the vibratory system 114, the operator interface 116 and the electrical system 118. The controller 104 can also communicate with various other components, systems or sub-systems of the working machine 10 not specifically illustrated. The machine drive 106 can comprise the various components (e.g., electrical motor, transmission, wheel(s) or other motive units, etc.) of the power train. By way of such connection, the controller 104 can receive data pertaining to the current operating parameters of the working machine 10 from the operator interface 116 and various sensors, such as the criteria sensor(s) 108, the environmental sensor(s) 110, and the like. In response to such input, the controller 104 may perform various determinations and transmit output signals corresponding to the results of such determinations or perform corresponding actions that need to be performed, such as for limiting, reducing or disabling one or more of the machine feature(s)112 to reduce power consumption of the battery 102. Thus, the controller 104 can increase an operational life of the battery 102 to allow the working machine 10 to perform various tasks (e.g., compacting, hauling, laying asphalt, transport soil, etc.) for a longer duration than would be the case if power consumption was not so limited.

Put another way, the controller 104 can select an appropriate operational mode for the working machine 10 from a plurality of operational modes for the working machine 10. One or more of the plurality of operational modes can limit one or more of the machine feature(s) 112 to reduce power consumption of the batter 102 as further discussed herein.

The controller 104, including operator interface 116, can include various output devices, such as screens, video displays, monitors and the like that can be used to display information, warnings, data, such as text, numbers, graphics, icons and the like, regarding the status of the working machine 10 including real-time power consumption data including remaining charge of the battery 102, remaining operational time, remaining operational time given operation mode of the machine, power consumption associated with a particular one of the machine feature(s) 112, etc. The controller 104, including the operator interface 116, can additionally include a plurality of input interfaces for receiving information and command signals from various switches and sensors associated with the working machine 10 and a plurality of output interfaces for sending control signals to various actuators, auxiliary systems, or the like associated with the working machine 10. Suitably programmed, the controller 104 can serve many additional similar or wholly disparate functions as is well-known in the art With regard to input, the controller 104 can receive signals or data from operator interface 116 (such as at a control panel in the cab of FIG. 1), the criteria sensor(s) 108, the environmental sensor(s) 110, the vibratory system 114, the electrical system 118 and the like. As can be seen in the example illustrated in FIG. 2, the controller 104 can receive signals from operator interface 116. Such signals received by controller 104 from operator interface 116 can include, but are not limited to, inputs to limit the machine feature(s) 112 (e.g., to select a mode of operation) that preserves or extends operational life of the battery 102.

The criteria sensor(s) 108 can be one or more sensors variously constructed as known in the art. The criteria sensor(s) 108 can measure operational characteristics that relate to power consumption such as, but not limited to one or more of: machine speed, machine acceleration, whether operating lights on the vehicle are turned on, amount of vibration generated by machine (e.g., amplitude and/or frequency), operation of heating or air conditioning to the cab, whether a window(s) to the cab is open, operation information related to various auxiliary systems (e.g., screed heat/temperatture, tire pressure, etc.). Operator interface 116, database 105 or other input can be used to add additional criteria input to the controller 104 regarding machine operational characteristics such as but not limited to any one or combination of: a planned operational period for the working machine (e.g., this can factor in any machine recharging time available such as during a lunch break), a size of the work area, an amount of material to be moved by the working machine, a time to recharging of the one or more batteries, operator preference, and/or a proximity to a charging station.

The environmental sensor(s) 110 can provide further input(s) to the controller 104 and can include any one or combination of: workplace topography (e.g., slope), workplace size, location of a charging station for the battery 102, ambient-temperature, presence and amount of ambient light, or the like. Environmental sensor(s) 110 or criteria sensor(s) 108 can also sense other factors including operation of an air conditioning unit (or heat) in an operator's cabin of the working machine, a position (open, partially open or closed) of a window of operator's cabin, or an operation of one or more lights on the working machine.

The electrical system 118 can be configured to communicate with and can be electrically coupled to electrical components of the working machine 10 including the battery 102 and the controller 104. The controller 104 can control the electrical system 118 to operate in one of a plurality of operation modes for the electrical system 118. For example, machine features 112 such as head-lights, cabin lights, display lights, power to nonessential auxiliary systems can be coupled to the electrical system 118 and can be controlled to operate differently according to a different one of the plurality of operation modes. The electrical system 118 can measure (e.g., sense), calculate or otherwise determine a remaining charge of the battery 102 and can communicate this information with the controller 104 such as in real-time. The electrical system 118 can additionally provide power to operate various components of the working machine 10 including displays, auxiliary systems or the like.

The controller 104 can also receive data from other controllers, systems or components for the working machine 10. In examples, controller 104 can control the operational status (e.g., operation mode) of the working machine 10. In some examples, controller 104 can autonomously and without operator intervention select and operate the working machine 10 in one of the plurality of operation modes including in one or more operation modes that limit the machine feature(s) 112, and thereby, preserve charge of the battery 102 for a longer time period.

FIG. 2 illustrates specific examples of machine features 112 that can be adjusted to reduce power consumption of battery 102, These machine features 112 include the machine drive 106 (speed and/or acceleration can be reduced according to one or more of the plurality of operation modes), the vibratory system 114 (compactor drum amplitude or frequency can be reduced or turned off according to one or more of the plurality of operation modes) and/or the electrical system 118 (head-lights, cabin lights, display lights, etc. can be reduced or turned off according to one or more of the plurality of operation modes), FIG. 3 shows a flow chart of an exemplary technique 200 for controlling power consumption of the battery of the working machine. The technique includes inputs such as one or more criteria 202 related to working machine operational characteristics and a remaining battery charge 204. Examples of the one or more criteria 202 are discussed previously in regard to FIG. 2. Optionally, the inputs can include operator preference 206 according to some examples.

Based upon the one or more criteria 202 (the one or more criteria 202 can include environmental factors such as those sensed with one or more environmental sensors as well), the remaining battery charge 204 and optionally the operator preference 206, the technique 200 as implemented by the controller can determine if a full performance mode 208 should be implemented, if such full performance mode is implemented at 210, machine features (e.g., heat or air conditioning in an operator's cabin, machine speed, machine acceleration, machine lights, drum vibration, screed heat or other auxiliary systems) are not limited and are fully operable.

However, according to some examples the technique implemented by the controller can determine that a reduced power consumption mode 212 should be implemented to conserve energy and extend duration of operation of the working machine. The determination can be based upon the one or more criteria. 202, the remaining battery charge 204 and optionally the operator preference 206. According to this reduced power consumption mode 212, one or more features of the machine that consume power can be adjusted 214. The adjusting 214 of the one or more features of the working machine can be based upon at least one of a sensed one or more features of the working machine, power consumption of such feature, a sensed environmental factor for the working area, operational criteria related to the working machine or other factors as discussed previously and subsequently. Such adjustment can include, but is not limited to, one or more of: reducing or disabling heat or air conditioning in an operator's cabin of the working machine (such as if the window to the cab is sensed to be open or the ambient temperature is in a desired range), reducing acceleration of the working machine; reducing a top speed of the working machine, reducing illumination of or disabling lights of the working machine (including head-lights, cab lights, and/or display lights), reducing or disabling a vibration generated by the working machine, reducing or disabling heat generated by one or more components of the working machine (e.g., screed heat), and/or limiting or disabling operation of one or more auxiliary systems of the working machine.

The determination can be made automatically without operator input according to some examples. However, according to other examples operator input 216 can be requested and/or the operator can be alerted of the determination as to the mode of operation and other information related to that mode of operation (e.g., run time available in that mode of operation).

FIG. 4 shows three exemplary modes of operation for the working machine. These modes are a plurality of operation modes 300 for the working machine. The number of operation modes shown is purely exemplary and more or fewer modes of operation than the three illustrated are contemplated according to other embodiments. The plurality of operation modes 300 include a full performance mode 302, where all operational features of the working machine are functional and power consumption of the battery is not a concern. The plurality of operation modes 300 further include a battery power conservation mode 304 to extend duration of the battery before charge is required, According to this battery power conservation mode 304, one or more operational features are limited or disabled. FIG. 4 shows various examples of such features.

FIG. 4 shows a failsafe operation mode 306. According to the failsafe operation mode 306, battery power may only be utilized for motive energy to return the working machine to a charging station as battery charge may be substantially exhausted for this failsafe operation mode 306 to be implemented. According to some examples, the failsafe operation mode 306 may reserve some battery power to perform essential tasks required to maintain the working order of the machine prior to shutdown to recharge at the charging station. For example, with a paver operating in the failsafe operation mode 306, a hopper thereof would be cleared of any hot asphalt remaining therein prior to total battery discharge and machine shutdown. Failure to clear such asphalt prior to shutdown would allow the asphalt to set necessitating overhaul of the paver.

FIG. 5 shows a schematic diagram of exemplary factors which can be implemented by the controller utilized in determining what operational features of the working machine should be adjusted. FIG. 5 is purely exemplary. The amount of adjustment or selection of which of the operational features should be adjusted can balance power consumption associated with the feature 402 v. importance of the feature to performance of the working machine 404. The importance of the feature can weigh or consider various items and can differ at different periods in time. The importance of the feature can weigh or consider items including a safety benefit associated with having the feature, the importance of the feature to job completion, time or other project constraints and if the feature affects these, operator comfort, impact of the feature of future operational capability of the working machine, etc. As an example of the safety benefit, having headlights operational during daytime would have a reduced safety benefit as compared to having headlights operational during dusk or dark. Job completion criteria could be influenced or relate to the amount of material that must be moved or hauled, the existence of lunch break or other stoppage for recharge, a size of the working area, a topography of the working area, and other project management considerations. Time constraints can include operational hours anticipated. Operator comfort could consider importance of air conditioning on a hot day (e.g., above 80 degrees Fahrenheit) as having increased weight as opposed to the need for air conditioning when the ambient temperature is between 75 degrees Fahrenheit and 60 degrees Fahrenheit. Operator comfort could consider if the working machine has operator cab windows open (or lacks windows) in weighting as well (e.g., need for air conditioning would be reduced if window(s) are open). Impact on future operational capability would consider situations such as clearing asphalt from the hopper of a paver prior to machine shutdown as having an extreme importance so as to override any need for saving power consumption.

Industrial Applicability

Currently electrification of heavy equipment (termed "working machines" herein) for construction, hauling, paving, mining, etc. is driving the need to develop energy efficient working machines. Efficiency is important as space to house batteries on such machines is limited. Power management of battery powered working machines will be essential to such working machines achieving desired tasks within an allotted time period given batter storage capacity, battery size and other factors. Oftentimes conventionally operation of such working machine is completed at peak performance when peak performance is not necessary to complete the task. Control of one or more features of the machine can be adjusted to conserve energy when machine performance is not needed, and/or battery charge is low. As an example, working lights for the working machine can be disabled in daylight and/or air conditioning in the operator cabin can be disabled if windows are open.

The present application contemplates use of the various apparatuses, systems and methods to reduce battery power consumption increasing operational life of the batteries between charges while not sacrificing on achieving project goals. For example, machine speed and/or acceleration could be reduced, vibration on compactors can be limited in frequency and/or amplitude or completely disabled. This is all in an effort to reduce power consumption prior to the machine being completely disabled due to the battery being completely, discharged. The present application thus contemplates a plurality of operational modes including those where one or more features of the working machine are adjusted (e.g., reduced or disabled) to reduce battery power consumption. These plurality of operation modes include a failsafe mode that allows the working machine to perform only basic functions such as providing for mobility back to a charging station and/or performing essential tasks.

The above detailed description is intended to be illustrative, and not restrictive. The scope of the disclosure should, therefore, be determined with references to the appended claims, along with the full scope of equivalents to which such claims are entitled.

What is claimed is:

1. A working machine comprising:
   one or more batteries driving movement of the working machine within a work area; and
   a controller configured to receive criteria relating to one or more operational characteristics of the working machine and determine one of at least three operation modes for the working machine based upon the criteria and a remaining charge of one or more batteries, wherein the at least three operation modes includes a full performance mode, a battery power conservation mode and a failsafe operation mode.

2. The working machine of claim 1, wherein the controller automatically controls operation of the working machine without human intervention to operate the working machine in the one of the at least three operation modes.

3. The working machine of claim 1, wherein the one or more batteries power an electrical system of the working machine and the controller controls the electrical system to operate in the one of the at least three operation modes for the electrical system.

4. The working machine of claim 1, wherein the criteria include one or more of a planned operational period for the working machine, a size of the work area, an amount of material to be moved by the working machine, a time to recharging of the one or more batteries, a sensed one or more features of the working machine, a sensed environmental factor for the work area, operator preference, or a proximity to a charging station.

5. The working machine of claim 1, wherein the battery power conservation mode and the failsafe operation mode each reduces a power consumption of the one or more batteries by adjusting one or more features of the working machine to conserve energy.

6. The working machine of claim 5, wherein the one or more features of that are adjusted comprise one or more of:
   reducing or disabling air conditioning in an operator's cabin of the working machine;
   reducing acceleration of the working machine;
   reducing a top speed of the working machine;
   reducing illumination of or disabling lights of the working machine;
   reducing or disabling a vibration generated by the working machine;
   reducing or disabling heat generated by one or more components of the working machine; or
   limiting or disabling operation of one or more auxiliary systems of the working machine.

7. The working machine of claim 5, wherein the one or more features of the working machine are adjusted based upon at least one of a sensed one or more features of the working machine or a sensed environmental factor for the working area.

8. The working machine of claim 5, wherein the failsafe operation mode that completely disables one or more of the one or more features due to the one or more batteries being substantially completely discharged, wherein the failsafe operation mode allows for power consumption from the one or more batteries of the working machine to perform only essential tasks and for motive power to return to a charging station.

9. The working machine of claim 5, wherein the controller alerts an operator of the working machine of a power consumption of the one or more batteries associated with the one or more features.

10. The working machine of claim 7, wherein the sensed one or more features includes one or more of a sensed operation of an air conditioning unit in an operator's cabin of the working machine, a sensed position of a window of the operator's cabin, or a sensed operation of one or more lights on the working machine.

11. The working machine of claim 1, wherein the controller requests an input from an operator of the working machine to select the one of the at least three operation modes for the working machine based upon the criteria and remaining charge of one or more batteries and alerts the operator as to a remaining operation time for the working machine based upon the selected one of the at least three of operation modes.

12. A method of controlling power consumption of one or more batteries of a working machine, the method comprising:
   monitoring with a controller criteria relating to one or more operational characteristics of the working machine;
   determining with the controller one of at least three of operation modes for the working machine based upon the criteria and a remaining charge of one or more batteries, wherein the at least three operation modes includes a full performance mode, a battery power conservation mode and a failsafe operation mode; and
   implementing the one of the at least three operation modes for the working machine.

13. The method of claim 12, further comprising repeating determining with the controller and selecting a second of the at least three operation modes and implementing the second of the at least three operation modes to reduce a power consumption of the one or more batteries by adjusting one or more features of the working machine to conserve energy.

14. The method of claim 12, wherein the criteria include one or more of a planned operational period for the working machine, a size of a work area, an amount of material to be moved by the working machine, a time to recharging of the one or more batteries, a sensed one or more features of the working machine, a sensed environmental factor for the work area, operator preference, or a proximity to a charging station.

15. The method of claim 12, further comprising repeating determining with the controller and selecting a the failsafe operation mode to completely disable one or more operational features of the working machine due to the one or more batteries being substantially completely discharged, wherein the failsafe operation mode allows for power consumption from the one or more batteries of the working machine to perform only essential tasks and for motive power to return to a charging station.

16. The method of claim 13, wherein adjusting the one or more features in the second of the at least three operation modes comprises one or more of:
   reducing or disabling air conditioning in an operator's cabin of the working machine;
   reducing acceleration of the working machine;
   reducing a top speed of the working machine;
   reducing illumination of or disabling lights of the working machine;
   reducing or disabling a vibration generated by the working machine;

reducing or disabling heat generated by one or more components of the working machine; or limiting or disabling operation of one or more auxiliary systems of the working machine.

17. A system for controlling power consumption of one or more batteries of a working machine, the system comprising:
   a working machine comprising:
   one or more batteries carried by the working machine and providing motive power for the working machine; and
   one or more sensors carried by the working machine and configured to collect one or more operational characteristics of the working machine; and
   a controller configured to receive criteria including a signal from the one or more sensors regarding operation of one or more features of the working machine and determine one of at least three operation modes for the working machine based upon the criteria and a remaining charge of one or more batteries, wherein the at least three operation modes includes a full performance mode, a battery power conservation mode and a failsafe operation mode.

18. The system of claim 17, wherein the one or more features sensed by the one or more sensors includes one or more of an operation of an air conditioning unit in an operator's cabin of the working machine, a position of a window of operator's cabin, or an operation of one or more lights on the working machine.

19. The system of claim 17, wherein the criteria include one or more of a planned operational period for the working machine, a size of a work area, an amount of material to be moved by the working machine, a time to recharging of the one or more batteries, a sensed one or more features of the working machine, a sensed environmental factor for the work area, operator preference, or a proximity to a charging station.

20. The system of claim 17, wherein the battery power conservation mode and the failsafe operation mode each reduces a power consumption of the one or more batteries by adjusting one or more features of the working machine to conserve energy, and wherein the one or more features of that are adjusted comprise one or more of:
   reducing or disabling air conditioning in an operator's cabin of the working machine;
   reducing acceleration of the working machine;
   reducing a top speed of the working machine;
   reducing illumination of or disabling lights of the working machine;
   reducing or disabling a vibration generated by the working machine;
   reducing or disabling heat generated by one or more components of the working machine; or
   limiting or disabling operation of one or more auxiliary systems of the working machine.

* * * * *